(12) United States Patent
Eto

(10) Patent No.: US 10,828,690 B2
(45) Date of Patent: Nov. 10, 2020

(54) DEVICE AND METHOD FOR FORMING END OF COILED SPRING

(71) Applicant: Mitsubishi Steel Mfg. Co., Ltd., Tokyo (JP)

(72) Inventor: Takashi Eto, Ichihara (JP)

(73) Assignee: Mitsubishi Steel Mfg. Co., Ltd., Tokyo (JP)

( * ) Notice: Subject to any disclaimer, the term of this patent is extended or adjusted under 35 U.S.C. 154(b) by 538 days.

(21) Appl. No.: 14/572,628

(22) Filed: Dec. 16, 2014

(65) Prior Publication Data

US 2015/0101699 A1    Apr. 16, 2015

Related U.S. Application Data

(63) Continuation of application No. 12/302,488, filed as application No. PCT/JP2007/060645 on May 24, 2007, now Pat. No. 8,915,112.

(30) Foreign Application Priority Data

May 30, 2006 (JP) .................. 2006-149296

(51) Int. Cl.
  *B21F 3/02* (2006.01)
  *B21F 3/04* (2006.01)
  (Continued)

(52) U.S. Cl.
  CPC .................. *B21F 3/02* (2013.01); *B21F 3/04* (2013.01); *B21F 3/10* (2013.01); *B21F 35/02* (2013.01); *F16F 1/12* (2013.01); *F16F 2226/00* (2013.01)

(58) Field of Classification Search
  CPC .... B21F 3/02; B21F 3/04; B21F 35/02; B21F 3/10
  See application file for complete search history.

(56) References Cited

U.S. PATENT DOCUMENTS 4,571,973 A    2/1986 Morita
4,945,744 A    8/1990 Lienert
(Continued)

FOREIGN PATENT DOCUMENTS

JP    59-199135    11/1984
JP    63-188439    8/1988
(Continued)

OTHER PUBLICATIONS

International Search Report for PCT Application No. PCT/JP2007/060645 dated Aug. 21, 2007.

*Primary Examiner* — Matthew Katcoff
(74) *Attorney, Agent, or Firm* — Knobbe, Martens, Olson & Bear, LLP

(57) ABSTRACT

A coil spring end forming apparatus is provided that includes a pair of horizontally disposed parallel rollers; a mandrel; a stopper that is provided adjacent to the circumferential surface of the mandrel and is moved up or down and rotated integrally with the mandrel; a clamp jig that is provided so as to be movable toward or away from the mandrel and that holds a semi-formed spring in cooperation with the mandrel, and a pusher for pushing the semi-formed spring toward the stopper, wherein in a state in which the axis of the mandrel is positioned between the axes of the parallel rollers and the semi-formed spring, a clamp portion holds the semi-formed spring at the inner side of a triangle formed by the axes of the parallel rollers and the semi-formed spring and rotates around the axis along the winding direction of the semi-formed spring to form a pigtail portion at one end of the semi-formed spring, and a coil spring end forming method is further provided.

5 Claims, 14 Drawing Sheets

(51) Int. Cl.
  *B21F 3/10* (2006.01)
  *F16F 1/12* (2006.01)
  *B21F 35/02* (2006.01)

(56) References Cited

U.S. PATENT DOCUMENTS

| | | | |
|---|---|---|---|
| 4,967,580 A | | 11/1990 | Morita |
| 2003/0159485 A1 | | 8/2003 | Fader et al. |
| 2005/0045241 A1 | * | 3/2005 | Dixon .................... B21F 35/02 140/103 |

FOREIGN PATENT DOCUMENTS

| | | |
|---|---|---|
| JP | 2003-290860 | 10/2003 |
| JP | 2005-349447 | 12/2005 |

\* cited by examiner

DEVICE AND METHOD FOR FORMING END OF COILED SPRING

CROSS-REFERENCE TO RELATED APPLICATIONS

This application is a continuation of U.S. application Ser. No. 12/302,488, filed Nov. 25, 2008, which is the U.S. national phase under 35 U.S.C. § 371 of prior PCT International Application No. PCT/JP2007/060645 which has an International Filing Date of May 24, 2007, which designates the United States of America, and which claims priority to Japanese Patent Application No. 2006-149296, filed on May 30, 2006. The International Application was published under PCT Article 21(2) in a language other than English. Each of the aforementioned applications is incorporated by reference herein in its entirety, and each is hereby expressly made a part of this specification.

BACKGROUND OF THE PRESENT INVENTION

1. Field of the Present Invention

The present invention relates to a coil spring end forming apparatus and a coil spring end forming method. More specifically, the present invention relates to a coil spring end forming apparatus and a coil spring end forming method for forming a pigtail portion at the end of a coil spring.

2. Description of the Related Art

In a suspension device of an automobile, a combination of a coil spring as a spring device and a shock absorber inserted into the inner side coil spring is widely used. In such suspension device, a direction of an input from a tire is not always matched with the axis of the shock absorber. Each time there is a vibration input from the tire to the shock absorber, a lateral load acts on the shock absorber. The lateral load acts between a piston and a cylinder of the shock absorber to cause sliding resistance. The riding comfort of the automobile can be deteriorated and the life of the shock absorber can be shortened.

As a method for solving the above problems, there are a method for mounting a coil spring so as to be offset with respect to the axis of a shock absorber and a method for forming pigtail portions having a pigtail shape at both ends of a coil spring and offsetting the axes of the pigtail portions with respect to the axis of a large-diameter portion of the coil spring.

When a pigtail portion is formed at the end of a coil spring, there is widely used a pigtail forming apparatus which forms, at the end of a semi-formed spring in a cylindrical coil shape, a pigtail portion as a conical winding portion whose diameter is gradually reduced toward its edge.

The pigtail forming apparatus typically has a forming jig driven rotatably and rotated while holding the open end of a cylindrical coil spring, a first engaging structure for fixing the end of the cylindrical coil spring onto the forming jig while a pigtail portion is formed on the cylindrical coil spring, and a second engaging structure for engaging and restricting a pigtail portion forming start point of the cylindrical coil spring (Patent Document 1).

In the pigtail forming apparatus, the end of the cylindrical coil spring is held by the first engaging structure and the pigtail portion forming start point is held by the second engaging structure. Then, with the end of the coil spring being held by the first engaging structure and the pigtail portion forming start portion being held by the second engaging structure, the forming jig is rotated to form the pigtail portion.

There is proposed another pigtail forming apparatus having clamp means for releasably clamping the open end of a cylindrical winding portion of a semi-formed spring; a platform on which the semi-formed spring is placed horizontally and which can be moved toward or away from the clamp means and can be moved up or down; a first engaging structure disposed on the platform and performing position regulation in the radius direction of the end winding portion of the semi-formed spring; a second engaging structure for regulating axial movement of the semi-formed spring with respect to the platform; rotating means for forcibly rotating the clamp means in the winding direction of the semi-formed spring; a first moving means for forcibly moving up the platform in such a manner that the center axis of the cylindrical winding portion is moved toward the rotation center of the clamp means in the state that the open end of the cylindrical winding portion positioned on the upper side of the semi-formed spring placed on the platform is clamped by the clamp means; and a second moving means for forcefully moving the platform along the center axis direction of the semi-formed spring (Patent Document 2).

[Patent Document 1] Japanese Patent Application Laid-Open (JP-A) No. 2005-349447

[Patent Document 2] Japanese Patent Application Laid-Open (JP-A) No. 2003-290860

SUMMARY OF THE PRESENT INVENTION

In both the pigtail forming apparatuses, the end of the semi-formed spring is held by the clamp portion provided near the mandrel and movement of the semi-formed spring in the axial direction or in the radius direction is regulated by various engaging structures.

The constitution of the pigtail forming apparatuses is complicated. It is difficult to shorten time from mounting of the semi-formed spring to formation of the pigtail portion.

The present invention has been made to solve the above problems and an object of the present invention is to provide a coil spring end forming apparatus and a coil spring end forming method, which require no engaging structures for regulating movement of a semi-formed spring in the axial direction or in the radius direction and can shorten time from mounting of the semi-formed spring to formation of a pigtail portion.

The invention according to a first aspect relates to a coil spring end forming apparatus comprising a pair of horizontally disposed parallel rollers rotated in the same direction and on which is mounted a cylindrical coil shaped semi-formed spring that tends toward formation of a pigtail portion at one end thereof; a mandrel which is a cylindrical body having an outer diameter smaller than an inner diameter of the semi-formed spring, that is horizontally disposed near one end of each of the parallel rollers; a stopper that is provided coaxially and integrally with the mandrel and receives the one end of the semi-formed spring; a clamp jig provided adjacent to the stopper to be movable toward or away from the mandrel, that forms a clamp portion with the mandrel and the stopper, and that holds the one end of the semi-formed spring in cooperation with the mandrel; and a pusher that pushes the semi-formed spring toward the stopper on the parallel rollers, wherein in a state in which the axis of the mandrel is positioned between the axes of the parallel rollers and the axis of the semi-formed spring, the clamp portion holds one end of the semi-formed spring at an inner side of a triangle formed by the axes of the parallel rollers and the semi-formed spring and rotates around the axis of the mandrel in a winding direction of the semi-formed spring to form the pigtail portion at one end of the semi-formed spring.

When the pigtail portion is formed on the semi-formed spring, the end of the semi-formed spring is held by the clamp portion to wind the semi-formed spring around the mandrel. The mandrel is offset with respect to the semi-formed spring and the mandrel is rotated around the axis in the state that the semi-formed spring is clamped by the clamp portion. The semi-formed spring receives a force in a direction of rotating in the same direction as the rotational direction of the mandrel around the portion held by the clamp portion. Accordingly, a force extending outward is caused to the semi-formed spring.

As described above, in the coil spring end forming apparatus, the axis of the mandrel is positioned between the axes of the parallel rollers and the axis of the semi-formed spring and the pigtail portion forming start position is on the inner side of the triangle formed by two axes of the parallel rollers and the axis of the semi-formed spring. The force extending the semi-formed spring outward caused by forming the pigtail portion on the semi-formed spring is received by at least one parallel roller. This can prevent the semi-formed spring from extending outward.

The end on the side forming the pigtail portion of the semi-formed spring is firmly held by the clamp portion. The semi-formed spring is not moved backward from the clamp portion during formation of the pigtail portion.

Accordingly, the coil spring end forming apparatus requires no engaging structures for regulating movement of the semi-formed spring in the axial direction or in the radius direction. The use of the coil spring end forming apparatus can reduce time required for the engaging structure to be moved toward or away from the semi-formed spring, thereby improving productivity.

The invention according to a second aspect relates to the coil spring end forming apparatus according to the first aspect, wherein the clamp portion is rotated around the axis of the mandrel and, at the same time, the clamp portion or the parallel rollers are relatively moved up or down to form the pigtail portion at one end of the semi-formed spring.

In the coil spring end forming apparatus, by setting the amount of movement of the clamp portion, both a coil spring having a pigtail portion axis at an identical position with the axis of the center portion of the semi-formed spring and a coil spring having a pigtail portion axis offset to the axis of the center portion of the semi-formed spring can be easily produced with high productivity.

The invention according to a third aspect relates to the coil spring end forming apparatus according to the first aspect, wherein when the semi-formed spring is clamped by the clamp portion, the pusher is moved away from the semi-formed spring.

In the coil spring end forming apparatus, when the semi-formed spring is clamped by the clamp portion, the pusher is moved away from the semi-formed spring. When the pigtail is formed on the semi-formed spring, the next semi-formed spring can be loaded immediately, and thus, production efficiency can be improved.

The invention according to a fourth aspect relates to a coil spring end forming method comprising: placing a semi-formed spring in a cylindrical coil shape that tends toward formation of a pigtail portion at one end thereof on a pair of horizontally disposed parallel rollers; pushing the semi-formed spring using a pusher toward a clamp portion provided adjacent to one end of parallel rollers while the semi-formed spring is rotated in a winding direction by the parallel rollers; bringing the one end face of the semi-formed spring into contact with a stopper provided at the clamp portion between the axes of the parallel rollers; positioning an axis of a mandrel between the axes of the parallel rollers and the axis of the semi-formed spring so as to hold the one end of the semi-formed spring by a clamp jig provided in the clamp portion, and the mandrel, at an inner side of a triangle formed by the axes of the parallel rollers and the semi-formed spring; and rotating the clamp portion around the axis of the mandrel along the winding direction of the semi-formed spring and winding one end of the semi-formed spring around the mandrel to form the pigtail portion.

As described in the first aspect, in the coil spring end forming method, the axis of the mandrel is positioned between the axes of the parallel rollers and the axis of the semi-formed spring, and the pigtail portion forming start position is on the inner side of the triangle formed by two axes of the parallel rollers and the axis of the semi-formed spring. The force extending the semi-formed spring outward caused by forming the pigtail portion on the semi-formed spring is received by the parallel rollers positioned on the opposite side of the clamp portion by interposing the axis of the mandrel therebetween. The semi-formed spring can be prevented from extending outward.

The end on the side forming the pigtail portion of the semi-formed spring is firmly held by the clamp portion. The semi-formed spring is not moved backward from the clamp portion during formation of the pigtail portion.

In the coil spring end forming method, it is possible to use the coil spring end forming apparatus having no engaging structures for regulating movement of the semi-formed spring in the axial direction or in the radius direction. Time required for the engaging structure to be moved toward or away from the semi-formed spring can be reduced to improve productivity.

The invention according to a fifth aspect relates to the coil spring end forming method according to the fourth aspect, wherein when the pigtail portion is formed at the one end of the semi-formed coil, the clamp portion or the parallel rollers are relatively moved up or down while the clamp portion rotates around the axis of the mandrel.

As described in the second aspect, in the coil spring end forming method, by setting the amount of movement of the clamp portion, both a coil spring having a pigtail portion axis at an identical position with the axis of the center portion of the semi-formed spring and a coil spring having a pigtail portion axis at an non-identical position with that of the axis of the center portion of the semi-formed spring can be easily produced with high productivity.

The invention according to a sixth aspect relates to the coil spring end forming method according to the fourth or fifth aspect, wherein when the one end of the semi-formed spring is held by the clamp portion, the pusher is moved away from the semi-formed spring to form the pigtail portion.

As described in the third aspect, in the coil spring end forming method, when the semi-formed spring is clamped by the clamp portion, the pusher is moved away from the semi-formed spring. When the pigtail is formed on the semi-formed spring, the next semi-formed spring can be loaded immediately, and consequently, production efficiency can be improved.

As described above, according to the present invention, there are provided a coil spring end forming apparatus and a coil spring end forming method which require no engaging structures for regulating movement of a semi-formed spring in the axial direction or in the radius direction and can reduce the time from mounting of the semi-formed spring to formation of a pigtail portion.

DESCRIPTION OF THE PREFERRED EMBODIMENTS

Embodiment 1

Figure 1:
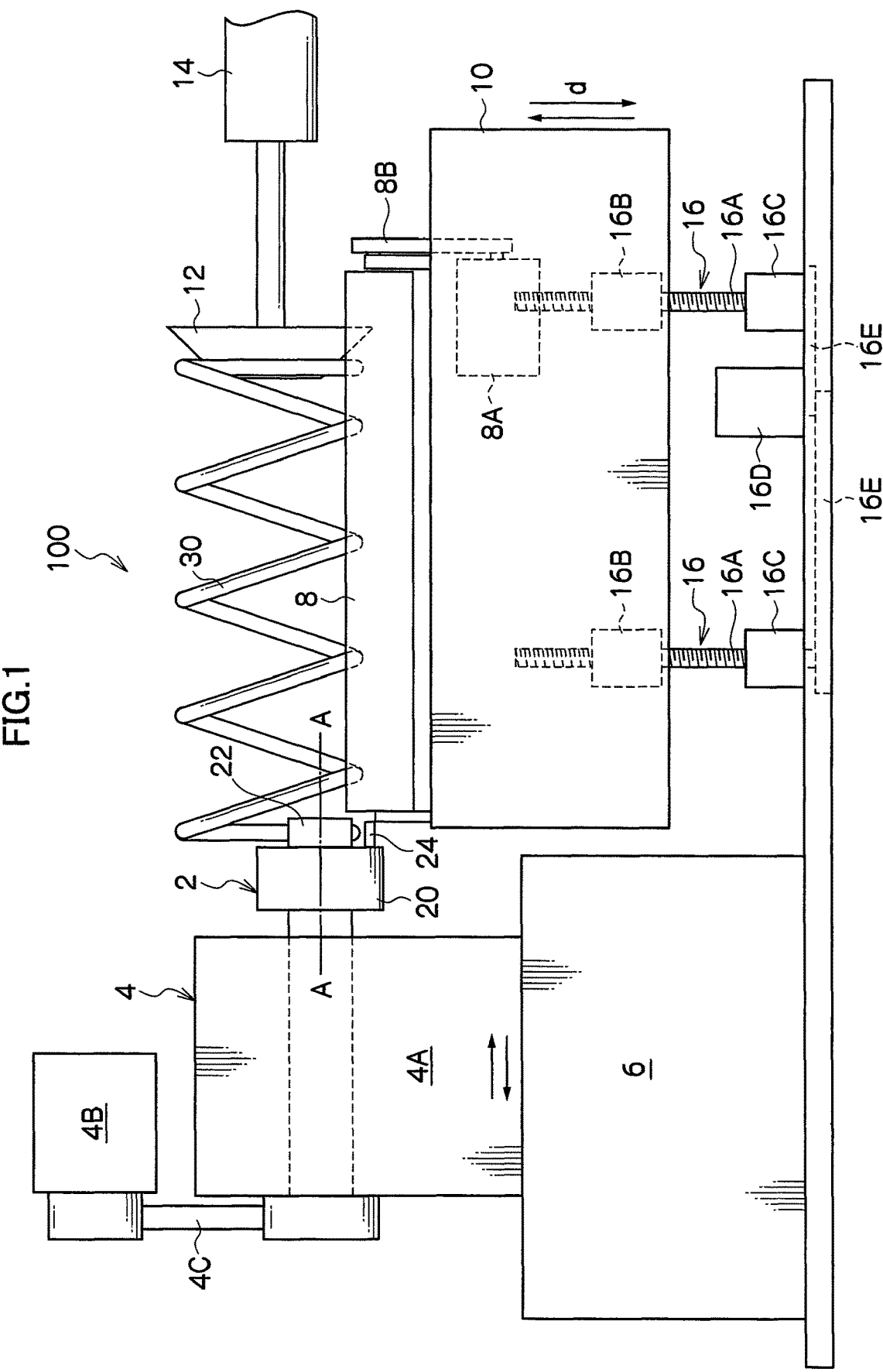
FIG. 1 is a side view showing the constitution of a coil spring end forming apparatus according to Embodiment 1.
Figure 2:
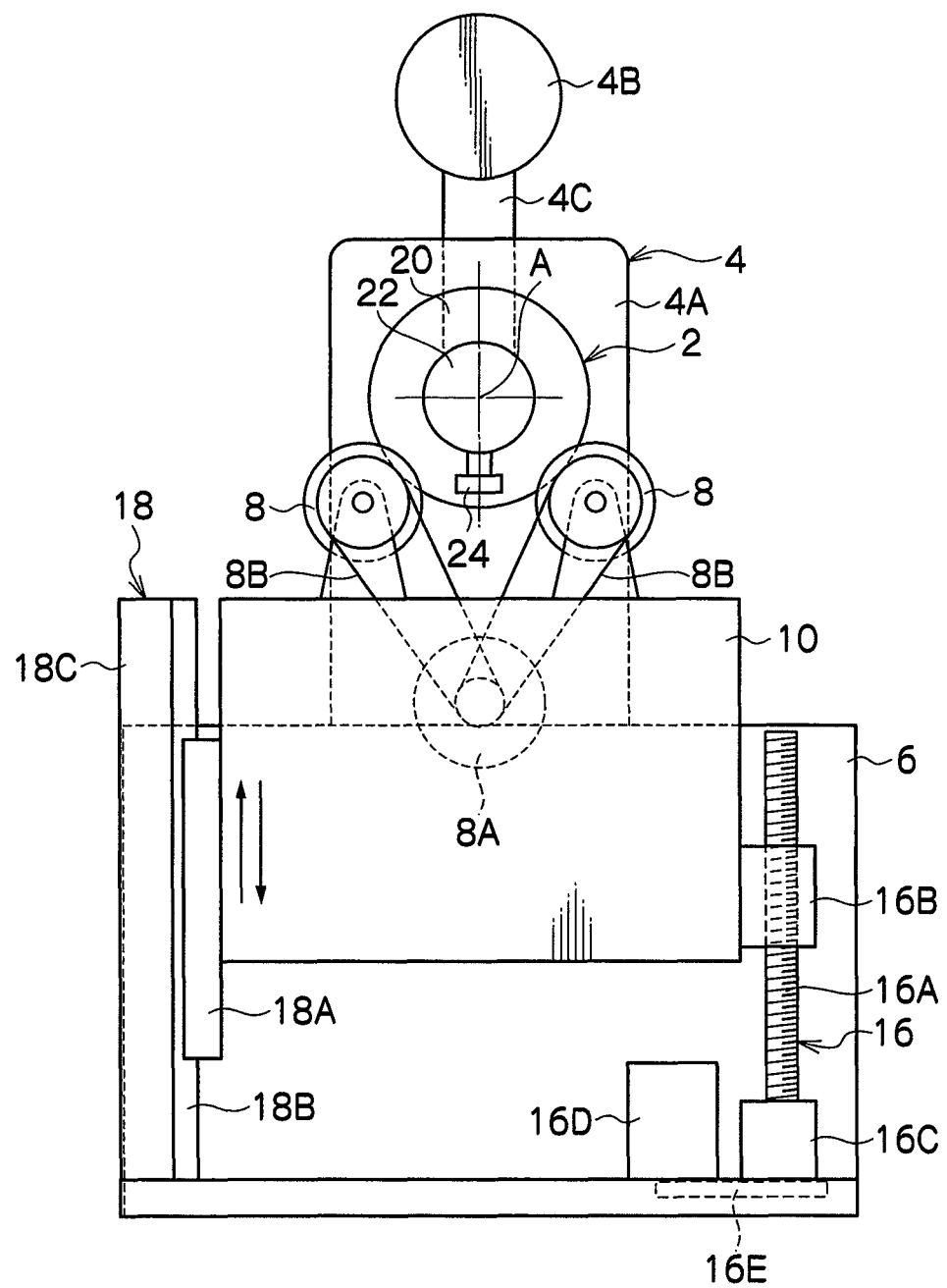
FIG. 2 is an end face view showing the constitution of the coil spring end forming apparatus according to Embodiment 1.

As shown in FIGS. 1 and 2, a coil spring end forming apparatus 100 according to Embodiment 1 has a clamp portion 2, a rotation driving portion 4 for rotating the clamp portion 2 around an axis A-A, a base 6 for supporting the rotation driving portion 4, a pair of parallel rollers 8 pro- vided adjacent to the rotation driving portion 4 and supported horizontally and in parallel with each other, a platform 10 for supporting the parallel rollers 8 from below, a pusher 12 provided across the parallel rollers 8 and relative to the clamp portion 2, and an actuator 14 fixed above the platform 10 and moving the pusher 12 toward or away from the clamp portion 2.

As indicated by arrows d, the platform 10 is supported by the base 6 so as to be moved up or down. The base 6 has a ball screw mechanism 16 for moving the platform 10 up or down, and a vertical guide mechanism 18 for supporting the platform 10 for up or down movement and vertically guiding it. The ball screw mechanism 16 and the vertical guide mechanism 18 are relatively provided to interpose the platform 10 therebetween. FIG. 1 shows the constitution of the platform 10 and the ball screw mechanism 16 and the vertical guide mechanism 18 is omitted.

The platform 10 has a motor 8A for rotatably driving the parallel rollers 8 and a timing belt 8B for transmitting the rotational force of the motor 8A to the two parallel rollers 8.

The clamp portion 2 has a cylindrical stopper 20 on which a cylindrical semi-formed spring 30 placed on the parallel rollers 8 abuts, a mandrel 22 protruded in the center portion of the end face of the stopper 20 coaxially with the stopper 20, and a clamp jig 24 provided on the end face of the stopper 20 so as to be moved toward or away from the mandrel 22 and holding the end of the semi-formed spring 30 in cooperation with the mandrel 22. The clamp portion 2 is formed in such a manner that when the stopper 20 and the mandrel 22 are rotated around the axis A-A, the clamp jig 24 is rotated integrally.

The rotation driving portion 4 has a body 4A provided on the base 6 so as to be moved toward or away from the parallel rollers 8 in the direction of arrows a and rotatably supporting the clamp portion 2 around the axis A-A, a driving motor 4B for rotating the clamp portion 2 around the axis A-A, and a power transmission supporting portion 4C for fixing the driving motor 4B above the body 4A and incorporating a transmission mechanism (not shown) for transmitting the rotational force of the driving motor 4B to the clamp portion 2. The base 6 has a moving mechanism (not shown) for moving the body 4A in the direction shown by a pair of arrows.

The ball screw mechanism 16 has a ball screw 16A rotated by a motor 16D fixed to the base 6, a nut portion 16B fixed to the side surface of the platform 10 and threaded to the ball screw 16A, a ball screw supporting portion 16C fixed to the base 6 and vertically supporting the lower end of the ball screw 16A, and a timing belt 16E for transmitting the rotational force of the motor 16D to the ball screw 16A. When the motor 16D is rotated, the timing belt 16E transmits the rotational force of the motor 16D to the ball screw 16A to rotate the ball screw 16A. The nut portion 16B is moved up or down so that the platform 10 to which the nut portion 16B is fixed is also moved up or down.

The vertical guide mechanism 18 has a rail 18B provided vertically, a moving head 18A fixed to the side surface on the opposite side of the side provided with the nut portion 16B on the platform 10 and running on the rail 18B, and a rail support 18C erected vertically on the base 6 and supporting the rail 18B. When the platform 10 is moved up or down by the ball screw mechanism 16, the elevating head 18A fixed to the platform 10 runs on the rail 18B to vertically guide the platform 10. The platform 10 is moved up or down in the state that its top surface is held horizontally.

Figure 3:
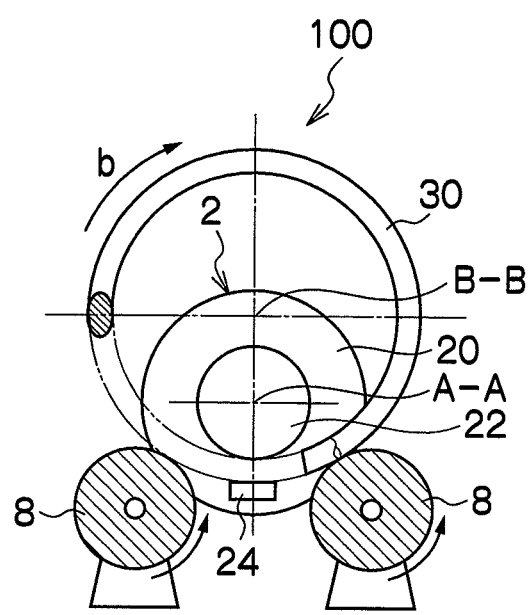
FIG. 3 is an explanatory view of the coil spring end forming apparatus shown in FIGS. 1 and 2 showing the operation of parts until a semi-formed spring placed on parallel rollers is pushed onto a stopper by a pusher.

The operation of the coil spring end forming apparatus 100 will be described using FIG. 3 and thereafter. In FIG. 3 and thereafter, the rotation driving portion 4, the base 6, and the platform 10 are omitted.

Figure 4:
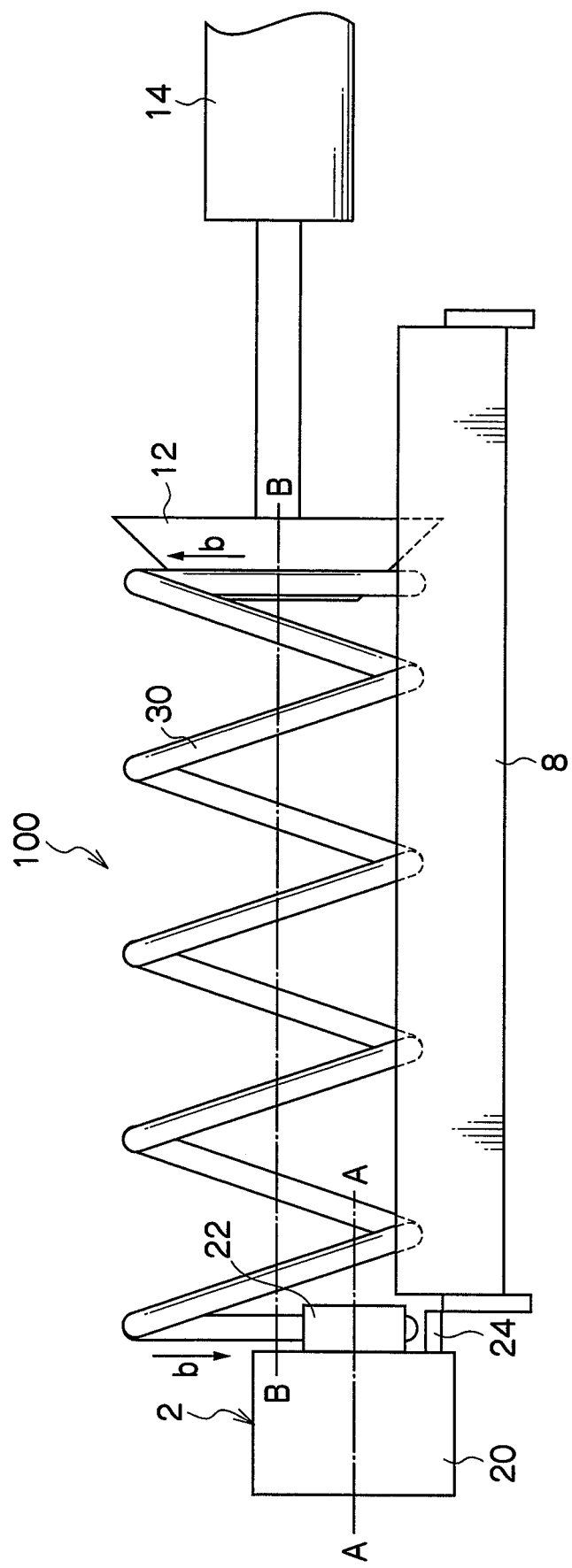
FIG. 4 is an explanatory view of the coil spring end forming apparatus shown in FIGS. 1 and 2 showing the operation of parts until the semi-formed spring placed on the parallel rollers is pushed onto the stopper by the pusher.

As shown in FIGS. 3 and 4, the parallel rollers 8 are rotated in the counterclockwise direction in the state that the semi-formed spring 30 is placed on the parallel rollers 8 to rotate the semi-formed spring 30 in the clockwise direction, as indicated by an arrow b, and the pusher 12 pushes the semi-formed spring 30 toward the stopper 20. The axis of the mandrel 22, that is, the axis A-A of the stopper 20 is positioned below an axis B-B of the semi-formed spring 30.

Figure 5:
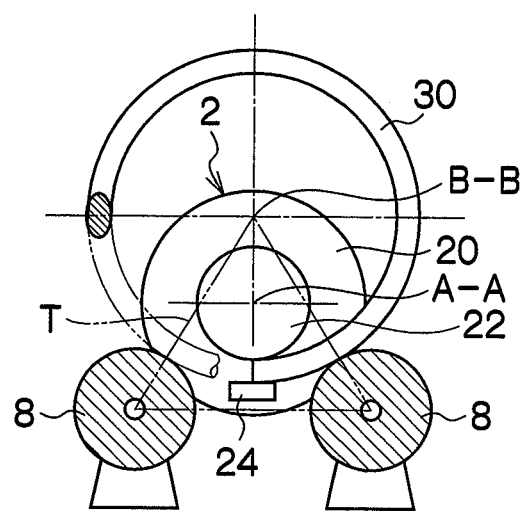
FIG. 5 is an explanatory view of the coil spring end forming apparatus shown in FIGS. 1 and 2 showing the operation of parts when one end of the semi-formed spring is held by a clamp portion.
Figure 6:
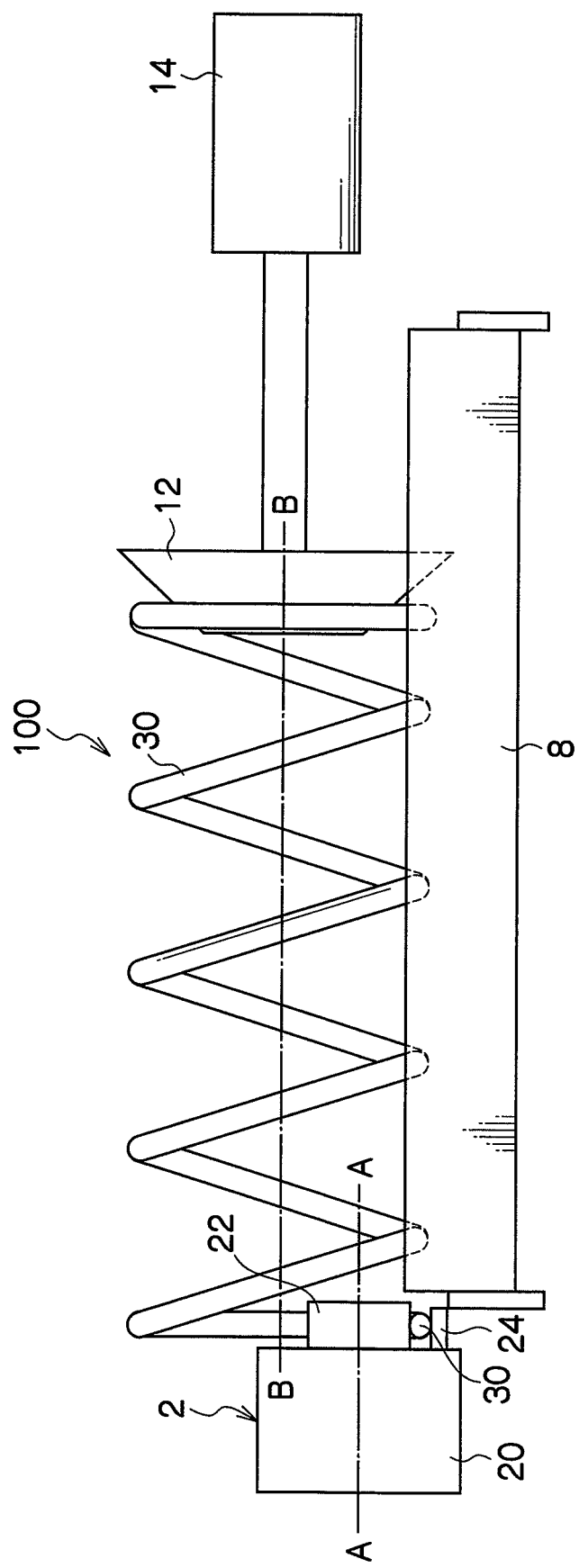
FIG. 6 is an explanatory view of the coil spring end forming apparatus shown in FIGS. 1 and 2 showing the operation of parts when one end of the semi-formed spring is held by the clamp portion.

When one end of the semi-formed spring 30 is inserted between the mandrel 22 and the clamp jig 24, as shown in FIGS. 5 and 6, rotation of the parallel rollers 8 is stopped to hold one end of the semi-formed spring 30 by the mandrel 22 and the clamp jig 24. As shown in FIG. 5, the position holding the semi-formed spring 30 by the stopper 20 and the clamp jig 24 is on the inner side of a triangle T formed by the axis B-B of the semi-formed spring 30 and the axes of the two parallel rollers 8. After one end of the semi-formed spring 30 is held by the mandrel 22 and the clamp jig 24, the pusher 12 may be moved away from the other end of the semi-formed spring 30, or as shown in FIG. 5 and thereafter, it may remain contact with the other end of the semi-formed spring 30.

Figure 7:
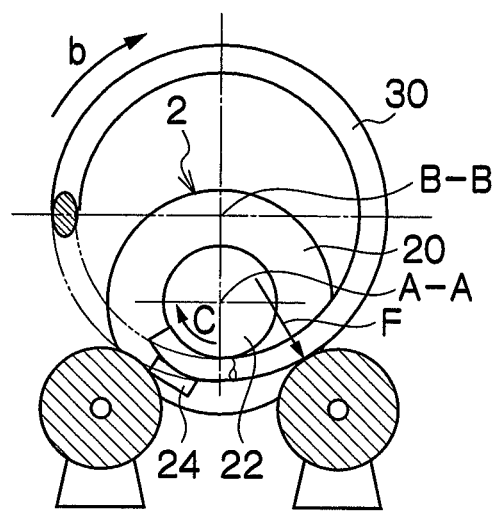
FIG. 7 is an explanatory view of the coil spring end forming apparatus shown in FIGS. 1 and 2 showing the operation of parts immediately after formation of a pigtail portion is started.
Figure 8:
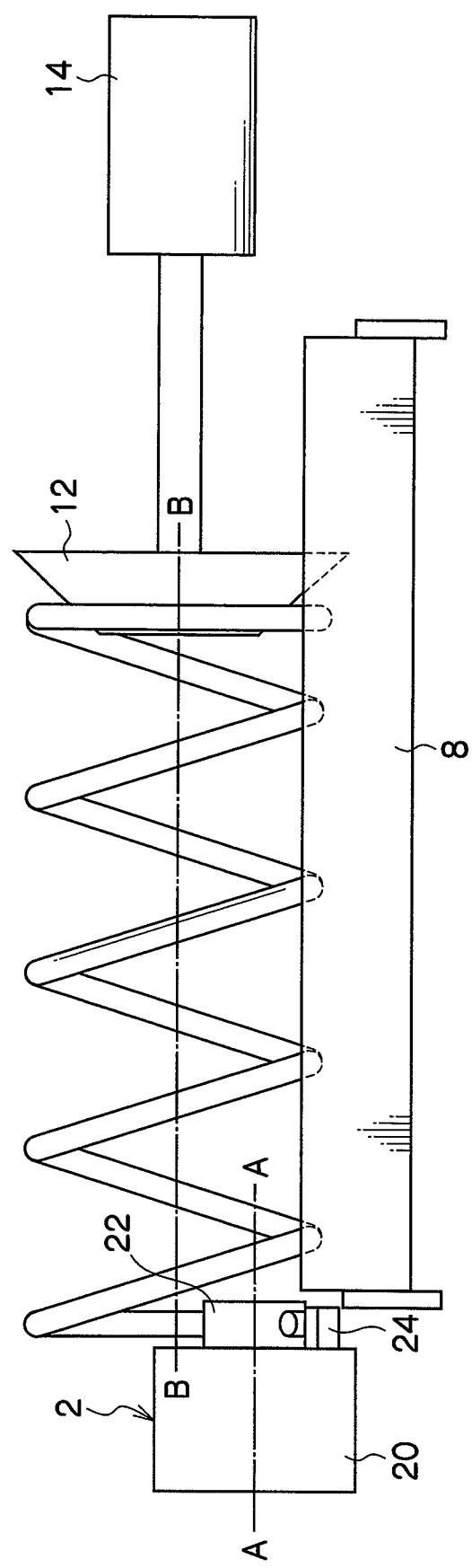
FIG. 8 is an explanatory view of the coil spring end forming apparatus shown in FIGS. 1 and 2 showing the operation of parts immediately after formation of the pigtail portion is started.
Figure 9:
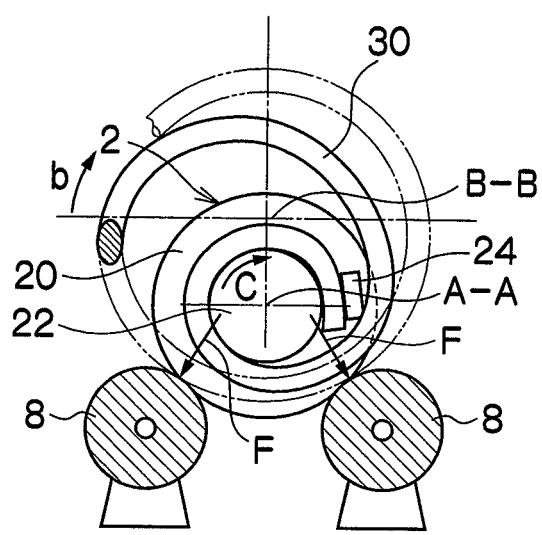
FIG. 9 is an explanatory view of the coil spring end forming apparatus shown in FIGS. 1 and 2 showing the operation of parts during formation of the pigtail portion.
Figure 10:
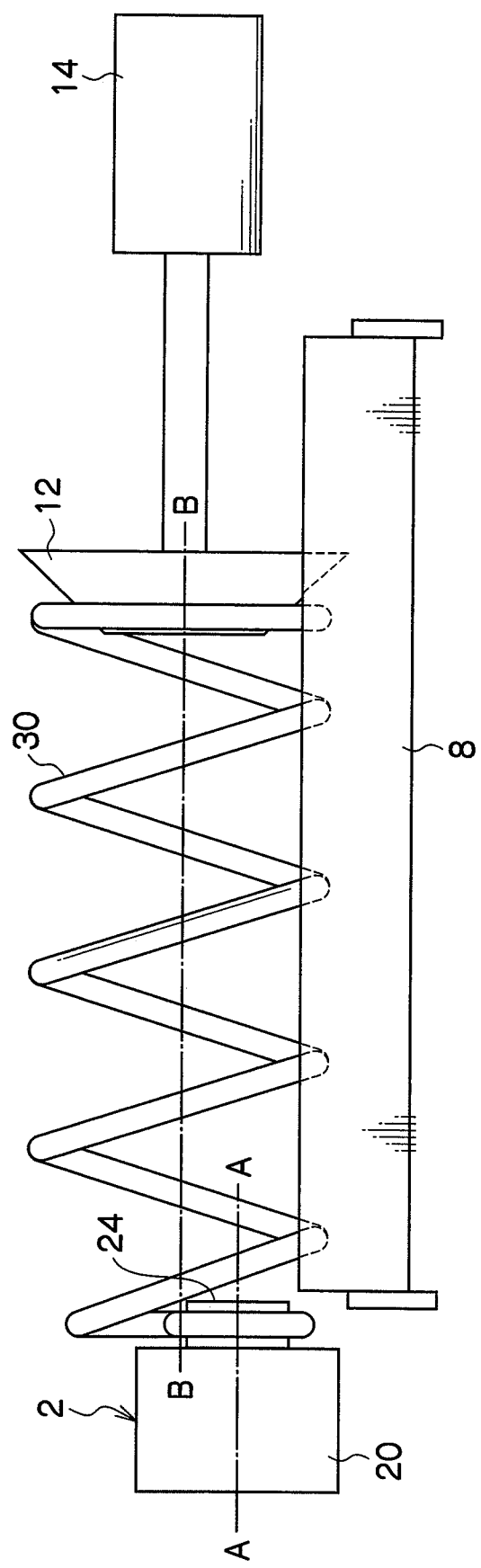
FIG. 10 is an explanatory view of the coil spring end forming apparatus shown in FIGS. 1 and 2 showing the operation of parts during formation of the pigtail portion.
Figure 11:
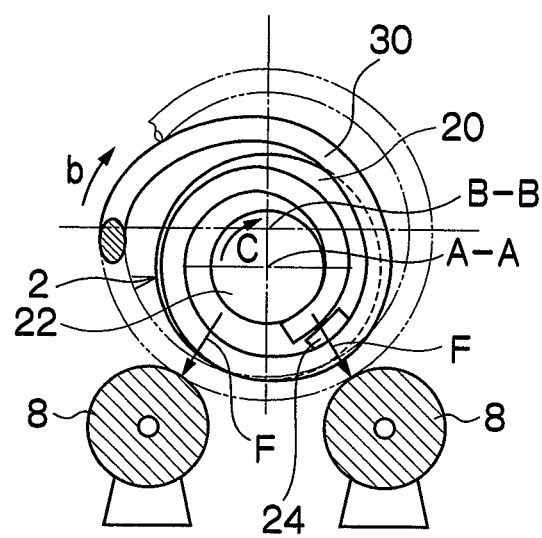
FIG. 11 is an explanatory view of the coil spring end forming apparatus shown in FIGS. 1 and 2 showing the operation of parts during formation of the pigtail portion.
Figure 12:
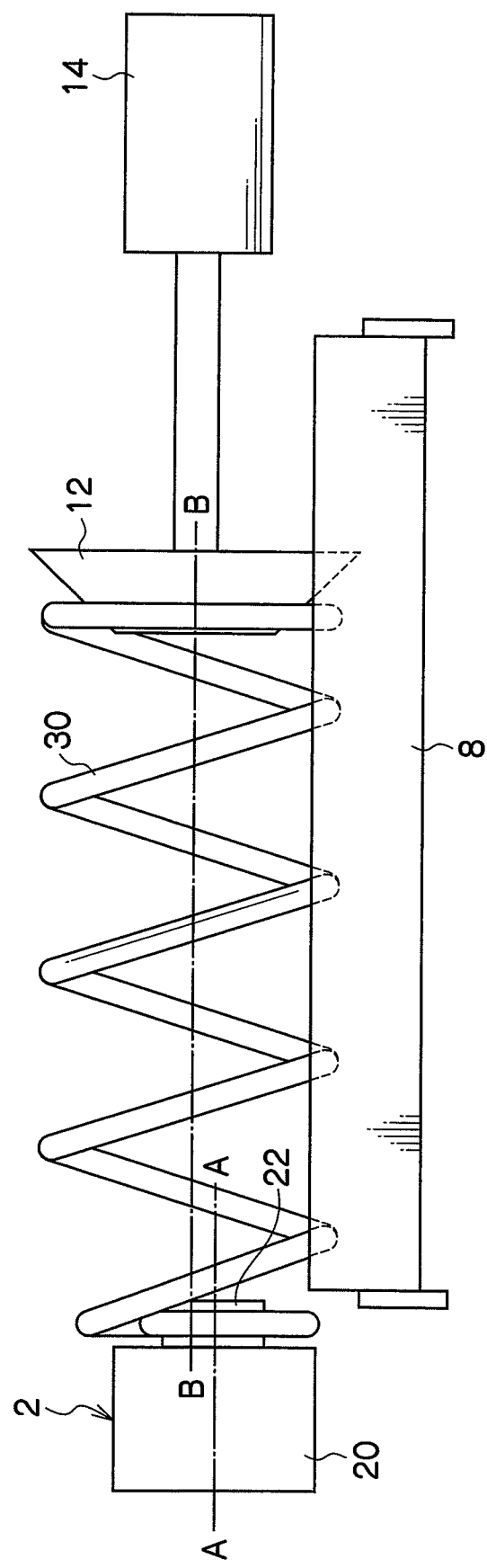
FIG. 12 is an explanatory view of the coil spring end forming apparatus shown in FIGS. 1 and 2 showing the operation of parts during formation of the pigtail portion.

After one end of the semi-formed spring 30 is held by the mandrel 22 and the clamp jig 24, as shown in FIGS. 7 and 8, rotation around the axis A-A of the stopper 20 of the clamp portion 2 is started. As indicated by an arrow c, the rotational direction of the clamp portion 2 is the winding direction of the semi-formed spring 30, that is, the clockwise direction. When rotation of the clamp portion 2 is started, as shown in FIG. 7 and thereafter, the force in a direction of bending inward by the clamp jig 24 and the mandrel 22 is exerted on one end of the semi-formed spring 30. The semi-formed spring 30 is rotated in the direction of the arrow b around the portion sandwiched between the clamp jig 24 and the mandrel 22 to exert a reaction force F in the direction extending outward on one or both of the parallel rollers 8. The reaction force F is received by the parallel rollers 8 to prevent the semi-formed spring 30 from extending outward.

When rotation of the clamp portion 2 is started, as shown in FIGS. 9 to 12, the clamp portion 2 is rotated around the axis A-A, and the ball screw mechanism 16 moves down the platform 10 and moves up the clamp portion 2 relative to the parallel rollers 8. The axis A-A of the stopper 20 is moved toward the axis B-B of the semi-formed spring 30. A pigtail portion can be formed in a predetermined position at one end of the semi-formed spring 30. By moving down the platform 10 and moving the rotation driving portion 4 relative to the base 6 so as to move the clamp portion 2 closer to the parallel rollers 8, a flat seat normal to the axis B-B of the semi-formed spring 30 can be formed at the end of the pigtail portion.

Figure 13:
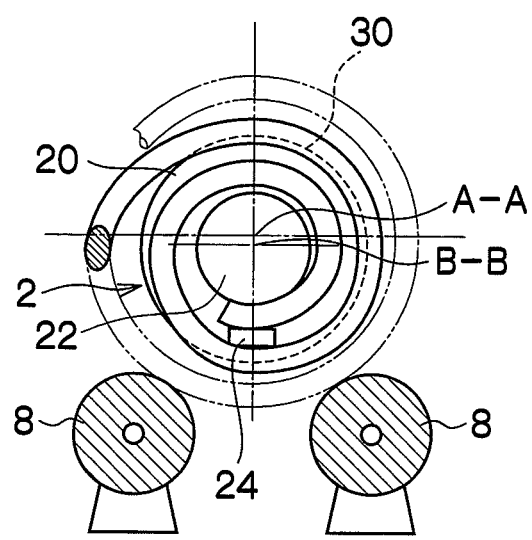
FIG. 13 is an explanatory view of the coil spring end forming apparatus shown in FIGS. 1 and 2 showing the operation of parts at completion of formation of the pigtail portion.
Figure 14:
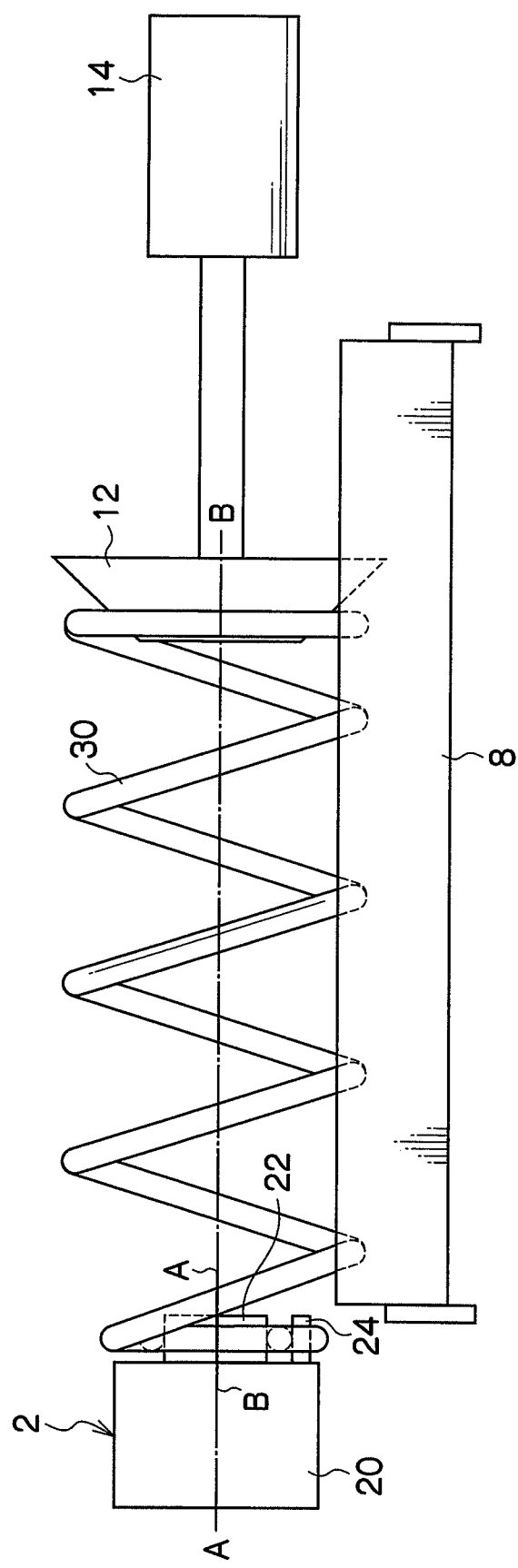
FIG. 14 is an explanatory view of the coil spring end forming apparatus shown in FIGS. 1 and 2 showing the operation of parts at completion of formation of the pigtail portion.

As shown in FIGS. 13 and 14, when the clamp portion 2 is rotated through one revolution, holding of the semi-formed spring 30 by the mandrel 22 and the clamp jig 24 is released to take out the semi-formed spring 30 having the pigtail portion formed at one end. In FIGS. 13 and 14, in the semi-formed spring 30, the pigtail portion is substantially coaxial with the center portion. The axes of the pigtail portion and the center portion of the semi-formed spring 30 may be offset to each other. The position relation between the pigtail portion and the center portion can be set by an amount of moving-up of the clamp portion 2.

As described above, in the coil spring end forming apparatus 100 according to Embodiment 1, the force extending the semi-formed spring 30 outward is received by one or both of the parallel rollers 8. No engaging structures for regulating movement of the semi-formed spring 30 in the radius direction are required. One end of the semi-formed spring 30 is securely held by the mandrel 22 and the clamp jig 24 during formation of the pigtail portion and cannot be moved longitudinally. No engaging structures for regulating movement of the semi-formed spring 30 in the axial direction are required.

EXPLANATION OF REFERENCE NUMERALS

2 Clamp portion
4 Rotation driving portion
6 Base
8 Parallel roller
10 Platform
12 Pusher
14 Actuator
16 Ball screw mechanism
20 Stopper
22 Mandrel
24 Clamp jig
30 Semi-formed spring
100 Coil spring end forming apparatus

What is claimed is:

1. A coil spring end forming apparatus comprising:
   a pair of horizontally disposed parallel rollers that rotate in the same direction and on which is mounted a cylindrical coil-shaped semi-formed spring that tends toward formation of a pigtail portion at a first end thereof;
   a mandrel, which is a cylindrical body having an outer diameter smaller than an inner diameter of the semi-formed spring, that is horizontally disposed near one end of the parallel rollers;
   a stopper that is provided coaxially and integrally with the mandrel and receives the first end of the semi-formed spring, wherein a relative position of the stopper and the mandrel does not change;
   a clamp jig that is provided adjacent to the stopper so as to be movable toward or away from the mandrel, that forms a clamp portion with the mandrel and the stopper, and that holds the first end of the semi-formed spring in cooperation with the mandrel; and
   a pusher that pushes a second end of the semi-formed spring toward the stopper on the parallel rollers,
   wherein the clamp portion is configured such that in a state in which the axis of the mandrel is positioned between axes of the parallel rollers and an axis of the semi-formed spring, the clamp portion holds the first end of the semi-formed spring at an inner side of a triangle formed by the axes of the parallel rollers and the semi-formed spring, and rotates around the axis of the mandrel in a winding direction of the semi-formed spring to form the pigtail portion at the first end of the semi-formed spring, and
   the coil spring end forming apparatus is configured such that no compression force perpendicular to an axis of a filament of the semi-formed coil spring is applied on the semi-formed coil spring between the pusher and the mandrel while forming the pigtail portion.

2. The coil spring end forming apparatus according to claim 1, wherein the clamp portion rotates around the axis of the mandrel and, at the same time, the clamp portion or the parallel rollers are relatively moved up or down to form the pigtail portion at the first end of the semi-formed spring.

3. The coil spring end forming apparatus according to claim 1, wherein when the semi-formed spring is clamped by the clamp portion, the pusher is moved away from the semi-formed spring.

4. The coil spring end forming apparatus according to claim 2, wherein when the semi-formed spring is clamped by the clamp portion, the pusher is moved away from the semi-formed spring.

5. The coil spring end forming apparatus according to claim 1, wherein the clamp portion rotates around the axis of the mandrel, the parallel rollers are moved down such that the clamp portion is moved up relative to the parallel rollers, and the pigtail portion is formed at the first end of the semi-formed spring.

\* \* \* \* \*